UNITED STATES PATENT OFFICE.

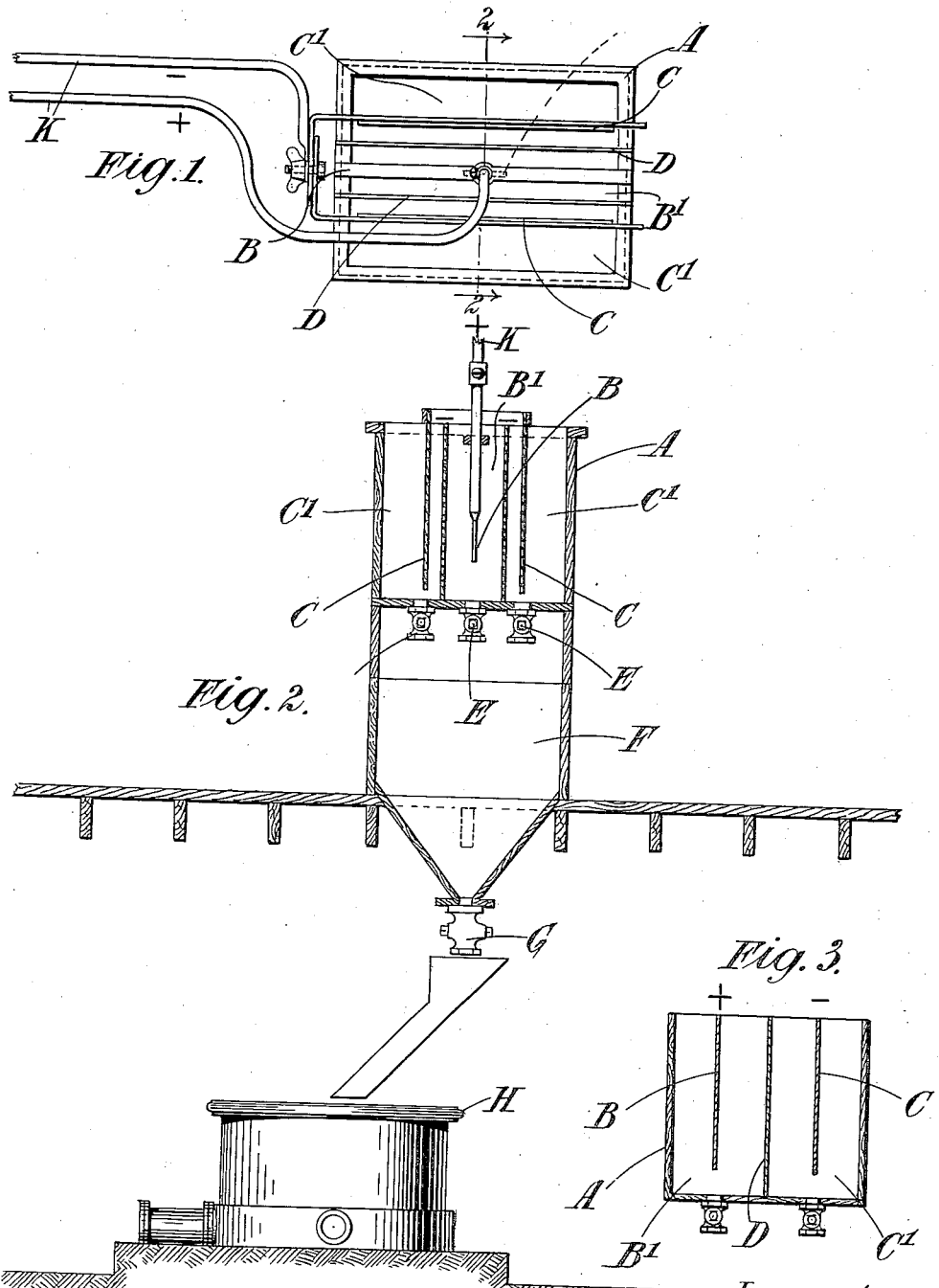

WILLIAM WATSON, OF DOVER, ENGLAND, ASSIGNOR TO WOODLANDS LIMITED, OF DOVER, ENGLAND.

TREATMENT OF WHEAT AND OTHER CEREALS OR CEREAL PRODUCTS.

1,189,023.  Specification of Letters Patent.  Patented June 27, 1916.

Application filed July 6, 1915. Serial No. 38,174.

*To all whom it may concern:*

Be it known that I, WILLIAM WATSON, a subject of the King of England, residing at Guildford Terrace, Dover, in the county of Kent, England, have invented certain new and useful Improvements in the Treatment of Wheat and other Cereals or Cereal Products, of which the following is a specification.

This invention is for improvements in or relating to the treatment of wheat and other cereals or cereal products, the object being to obtain therefrom flour improvers and valuable food products.

Hitherto it has been proposed to extract from bran and other cereal products certain constituents having a food value, for example by extraction with water, with alkali or with acid. It has also been proposed in the previous United States Patent No. 1063414 to produce a flour improver by the electrolysis of a solution of a sulfate, such as potassium bisulfate.

It is an aim of this invention to obtain an efficient flour improver from a cereal or cereal product or mixtures thereof in admixture with water; and also to obtain food products from such mixture. The term cereal and cereal product in this specification is to be understood to mean wheat, bran, or other offals or other cereals or cereal products, including the seeds of leguminous plants, such as peas, beans and the like, or their products.

According to this invention, I subject a mixture of water and a cereal or cereal product or mixtures thereof to electrolysis, to produce therein and extract therefrom flour improvers and valuable food products.

The process may be carried out in various ways. Thus bran, for example, may be mixed with water and subjected to electrolysis, after which the liquor and the finer solids are separated from the exhausted bran, and the separated mixture is either used direct, or after concentration, for admixture with flour for improving its baking qualities, and for increasing its food value, or is evaporated to dryness, and the residue used in the dry state for the same purpose. Instead of separating the liquor and the finer solids from the exhausted bran, the electrolyzed mixture of water and cereals or cereal products can be treated so as to remove water from the said mixture, and the resulting product is then suitable for use either as a flour improver or as a food product.

In carrying the process into effect, electrolytic cells may be employed in which the anode and cathode are separated by a porous diaphragm or diaphragms, or in which each or either is contained in its own porous pot, or in which no porous diaphragm or pot is used.

Two forms of the apparatus mentioned above will now be described with reference to the accompanying diagrammatic drawings of which—

Figure 1 is a plan view of one modification of the apparatus in which a single anode separated from cathodes on either side of it by porous diaphragms is employed. Fig. 2 is a section through the same on the line 2—2 of Fig. 1, Fig. 3 is a similar section through a further modification of the apparatus.

Like reference letters indicate like parts throughout the accompanying drawings.

Referring now to Figs. 1 and 2 of the drawings A denotes an electrolyzing tank having a single anode B separated from cathodes C on either side of it by porous diaphragms D forming two cathode compartments $C^1$ and one anode compartment $B^1$.

The mixture of a cereal or a cereal product or mixtures thereof and water is introduced into the cathode compartments $C^1$ and water into the anode compartment $B^1$ of the electrolyzing tank. The mixture is then subjected to electrolysis, the necessary current being supplied by the mains K. In the anode compartment $B^1$ an acid extract is obtained and in the cathode compartment an alkaline extract. Valves are provided at the bottom of the different compartments of the tank, for instance taps E, through which the treated contents of the different compartments may be discharged into a lower chamber E and from there through the cock G into the hydro-extractor H if so desired. I find the acid extract in the anode compartment to be very effective as a flour improver, that is to say if the extract in the liquid or in the dry form, is mixed with the flour before baking the strength and texture of the resulting loaf are improved. The extracts in the cathode compartment may contain products useful for their food value.

In Fig. 3 of the drawings a modification of the electrolyzing apparatus is shown in which only one cathode C separated from its anode B by a single porous diaphragm D is employed. In this case the wheat for example may be introduced into the anode compartment B¹, and both compartments B¹ and C¹ of the cell supplied with water, whereby upon electrolysis the wheat absorbs the anode products which are valuable flour improvers and the wheat may be dried, milled and admixed in any desired proportions with flour.

Examples of the process of obtaining an efficient flour improver and valuable food products from cereals and cereal products according to this invention will now be described.

Example 1: A mixture consisting of 100 grams of bran, 1000 grams of water, and 5 grams of phosphoric acid ($H_3PO_4$) was introduced into the cathode compartment of a cell having a single porous diaphragm, and subjected to electrolysis. 200 grams of water was introduced into the anode compartment. A platinum anode and a tin cathode were employed. A current averaging 1 ampere at a pressure of 70 volts was passed through the mixture for one hour. No stirring was necessary, and the bran solution became strongly alkaline, and the water in the anode compartment acid. After electrolysis, the bran was pressed and the liquid recovered was made up to 1000 grams by the addition of water, to which was added another 100 grams of bran, and the mixture was subjected to electrolysis for one hour as before. The process was repeated until 500 grams of bran had been treated. The whole of the 500 grams of bran residue was then taken with 1000 grams of water and subjected for two hours to electrolysis, a current of 1 ampere at a pressure of 70 volts being passed through the mixture. The mixture was then pressed and the liquid obtained added to that obtained from the first operation. The total quantity, about 1800 grams, was now mixed with the contents of the anode compartment and again electrolyzed, being placed in the anode compartment of a cell having a single porous diaphragm; about 200 grams of water was placed in the cathode compartment. A current of 1 ampere at 80 volts was passed for one hour, and the contents of the anode compartment were then ready for use as a flour improver.

The quantity of materials specified is sufficient for the treatment of 280 lbs. of flour. Though the first electrolysis of the bran and water is described as being carried out in several steps, with larger apparatus than was available for the experiments, the operations can be performed in a single process.

The phosphoric acid is added at the commencement of the operation to render the liquid a conductor. For commencing further operations, however, some of the liquid resulting from the electrolytic treatment may be employed instead of the phosphoric acid.

Example 2: A mixture of 14 lbs. of bran and 56 lbs. of water was introduced into a cylindrical glass vessel 18 inches deep and 12½ inches in diameter. Two horizontally placed electrodes were arranged in the vessel. The cathode consisted of a circular sheet of tin 12 inches in diameter placed at the bottom of the vessel. The anode consisted of a rectangular piece of platinum about 3 inches by 4 inches placed just below the surface of the mixture. No porous pot or diaphragm was employed. At the commencement of the operations a current of about 2 amperes at 70 volts was passed through the mixture. As the process proceeded the current gradually increased, and the voltage dropped until after about one hour the current passing through the mixture amounted to 6 or 7 amperes at a pressure of 40 volts. The current then decreased and the voltage rose again, until at the end of the second hour about 2 amperes were passing through the mixture at a pressure of 70 volts, as at the commencement. The upper portion of the mixture was now acid and the lower portion alkaline. Some of the alkaline liquor (about 10 lbs.) was drawn off, and the remainder of the mixture was strained through a press to remove the exhausted bran. The extract obtained had an acid reaction, and the degree of acidity may be controlled by varying the amount of the alkaline liquor withdrawn. A portion of the alkaline liquor may conveniently be added to the next mixing of bran and water to facilitate the passage of the current.

The extract obtained was ready for use, but its efficiency for flour improving purposes may be increased if it be electrolyzed for about two hours. The electrolysis may be carried out in the same or another apparatus. The extract is preferably stirred from time to time as electrolysis proceeds, and it is found desirable to keep the extract cool during the second electrolysis, though it is unnecessary in the first stage.

The quantity of extract obtained from each pound of bran is sufficient for the treatment of one sack (280 lbs.) of flour.

In carrying out the process according to this invention, the wheat or other cereal may be allowed to germinate or to malt before its use in the electrolytic process.

The electrodes may conveniently be of a material unaffected by the products of the electrolysis or of the current. Platinum may be used for the anode, and tin and aluminium are found to be very suitable for the cathode.

The aqueous products may be used direct or may be mixed with or sprayed on to flour, which is then dried and admixed in the desired quantities with flour or dough for baking, or the aqueous products may be concentrated or desiccated in any known manner and used in the concentrated or dry state for admixture with flour or dough.

It is to be understood that though the examples describe only the treatment of bran, a mixture of cereals or cereal products may be treated to obtain a flour improver and food product. In these examples either the acid or the alkaline extract or a mixture of the two may be further treated for the preparation of valuable food products by concentrating the separate extracts or mixture of extracts, as for example by concentrating *in vacuo* until they are of the desired consistency. Both the extracts contain valuable proteids and phosphoric acid, and the method of preparation of food substances from them is similar to the usual method employed in the manufacture of malt extract.

What I claim as my invention and desire to secure by Letters Patent is:—

1. A process for obtaining flour improvers and valuable food products which consists in subjecting a mixture of water and a cereal to electrolysis and separating from the solid residue the liquid extract thus produced for use for the purpose described.

2. A process for obtaining flour improvers and valuable food products which consists in subjecting a mixture of water and a cereal product to electrolysis and separating from the solid residue the liquid extract thus produced for use for the purpose described.

3. A process for obtaining flour improvers and valuable food products which consists in subjecting a mixture of water and mixed cereals to electrolysis and separating from the solid residue the liquid extract thus produced for use for the purpose described.

4. A process for obtaining flour improvers and valuable food products which consists in subjecting a mixture of water and a germinated cereal to electrolysis and separating from the solid residue the liquid extract thus produced for use for the purpose described.

5. A process for obtaining flour improvers and valuable food products which consists in subjecting a mixture of water and a cereal to electrolysis, separating from the solid residue the liquid extract thus produced and concentrating it for use for the purpose described.

6. A process for obtaining flour improvers and valuable food products which consists in subjecting a mixture of water and a cereal product to electrolysis, separating from the solid residue the liquid extract thus produced and concentrating it for use for the purpose described.

7. A process for obtaining flour improvers and valuable food products which consists in subjecting a mixture of water and mixed cereals to electrolysis, separating from the solid residue the liquid extract thus produced and concentrating it for use for the purpose described.

8. A process for obtaining flour improvers and valuable food products which consists in subjecting a mixture of water and a germinated cereal to electrolysis, separating from the solid residue the liquid extract thus produced and concentrating it for use for the purpose described.

9. A process for obtaining flour improvers and valuable food products which consists in subjecting a mixture of water and a cereal to electrolysis, separating from the solid residue the liquid extract thus produced and evaporating it to dryness for use for the purpose described.

10. A process for obtaining flour improvers and valuable food products which consists in subjecting a mixture of water and a cereal product to electrolysis, separating from the solid residue the liquid extract thus produced and evaporating it to dryness for use for the purpose described.

11. A process for obtaining flour improvers and valuable food products which consists in subjecting a mixture of water and mixed cereals to electrolysis, separating from the solid residue the liquid extract thus produced and evaporating it to dryness for use for the purpose described.

12. A process for obtaining flour improvers and valuable food products which consists in subjecting a mixture of water and a germinated cereal to electrolysis, separating from the solid residue the liquid extract thus produced and evaporating it to dryness for use for the purpose described.

13. A process for obtaining flour improvers and valuable food products which consists in subjecting a mixture of water and a cereal to electrolysis in a cell, separating the liquid alkaline extract from the cathode compartment of the cell, adding the separated extract to the acid contents of the anode compartment and electrolyzing the mixture in the anode compartment of a cell.

14. A process for obtaining flour improvers and valuable food products which consists in subjecting a mixture of water and a cereal product to electrolysis in a cell, separating the liquid alkaline extract from the cathode compartment of the cell, adding the separated extract to the acid contents of the anode compartment and electrolyzing the mixture in the anode compartment of a cell.

15. A process for obtaining flour improvers and valuable food products which consists in subjecting a mixture of water and mixed cereals to electrolysis in a cell, separating the liquid alkaline extract from the cathode compartment of the cell, adding the separated extract to the acid contents of the anode compartment and electrolyzing the mixture in the anode compartment of a cell.

16. A process for obtaining flour improvers and valuable food products which consists in subjecting a mixture of water and a germinated cereal to electrolysis, separating the liquid alkaline extract from the cathode compartment of the cell, adding the separated extract to the acid contents of the anode compartment and electrolyzing the mixture in the anode compartment of a cell.

In testimony whereof I have signed my name to this specification in the presence of two subscribing witnesses.

WILLIAM WATSON.

Witnesses:
ERNEST W. MOSES,
RONALD S. DOLLEYMORLE.